W. W. KINCAID.
RUBBER HOSE.
APPLICATION FILED NOV. 19, 1913. RENEWED OCT. 23, 1916.
1,206,230.
Patented Nov. 28, 1916.
FIG. 1
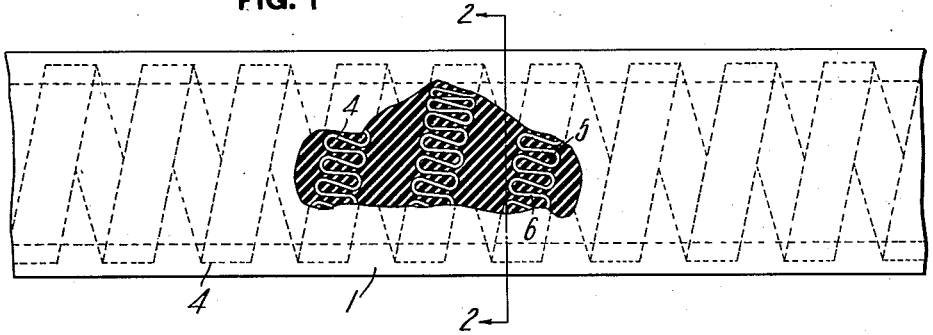
FIG. 3
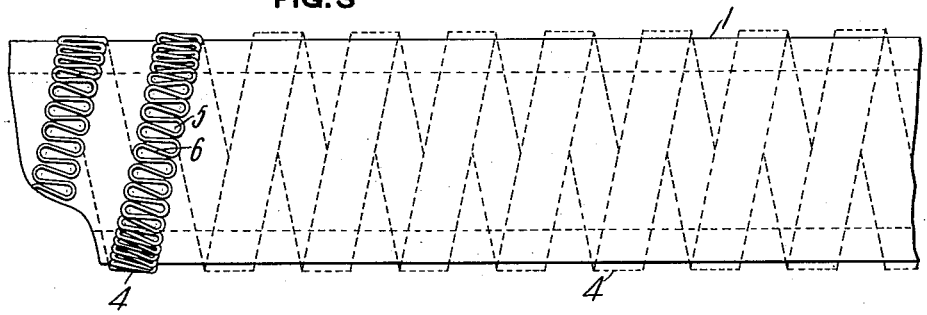
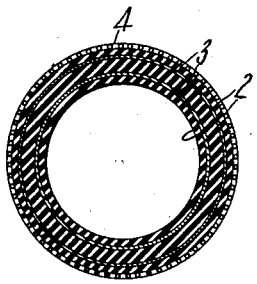
FIG. 4
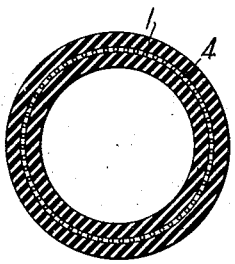
FIG. 2
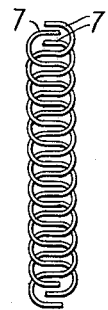
FIG. 5
WITNESSES
INVENTOR

UNITED STATES PATENT OFFICE.

WILLIAM W. KINCAID, OF MEADVILLE, PENNSYLVANIA.

RUBBER HOSE.

1,206,230.   Specification of Letters Patent.   Patented Nov. 28, 1916.

Application filed November 19, 1913, Serial No. 801,815. Renewed October 23, 1916. Serial No. 127,315.

*To all whom it may concern:*

Be it known that I, WILLIAM W. KINCAID, a resident of Meadville, in the county of Crawford and State of Pennsylvania, have invented a new and useful Improvement in Rubber Hose, of which the following is a specification.

This invention relates to reinforced or armored rubber tubes and hose.

The object of the invention is to produce an armored tube or hose which, as compared with prior articles of the same character, is more flexible, resilient, and elastic, less liable to collapse under suction or when sharply bent or flexed, and one which will withstand a greater bursting pressure, thereby adapting it particularly for use as air brake hose, for vacuum cleaner conduits, for pressure or suction lines of any kind, for inner tubes for vehicle tires, or for single tube vehicle tires.

The invention comprises the construction of a tube or hose hereinafter described and claimed.

In the drawings Figure 1 represents a broken out side view of a piece of hose or tubing embodying the invention; Fig. 2 is a cross section thereof on the line 2—2, Fig. 1, looking in the direction of the arrows; Fig. 3 is an outside view of another embodiment of the invention; Fig. 4 is a cross section thereof; and Fig. 5 is a detail view of another form of wire fabric reinforcement.

Referring to the drawings, the body wall of the tube or hose is represented at 1. Its composition and structure are immaterial and it may either be of solid rubber, as in Figs. 1 and 2, or may be formed of a plurality of layers or plies, as in Fig. 4, some of said layers, as 2, being formed of rubber or other elastic or flexible material, and others, such as 3, of canvas or other textile fabric, in the usual manner. The tube wall may be of any desired thickness, from comparatively thin pure rubber tires, such as used for inner tubes for vehicle tires, to thick walled tubes of alternate layers of rubber and fabric, such as are used for pressure and suction hose and lines.

The reinforcement 4 is a band or fabric of spring wire which may be wrapped around the outside of the tube, as in Figs. 3 and 4, or embedded in the walls or between its plies or layers, as in Figs. 1 and 2, or one such wire fabric may be wrapped around the tube and another embedded in its wall. The embedded wire reinforcement 4 is placed in the tube wall or between the plies or layers thereof, preferably before vulcanization, so the soft rubber can be thoroughly kneaded or worked into the spaces between the wires, and the reinforcement fully buried or embedded in, or covered with the rubber, thereby preventing voids or open spaces and also protecting the wire.

Various forms of wire fabric reinforcement are suitable for carrying out the invention, two forms being illustrated in the drawings. As shown in Figs. 1 and 3 the fabric comprises a single spring wire bent back and forth into sinuous or serpentine form to form a series of eyes or loops 5, lying along the edges of the fabric and connected by transverse crossing portions 6. The latter may be normal to the length of the fabric, but are shown as inclined thereto with the loops or eyes pear-shaped. Successive loops or eyes may overlap each other slightly, but preferably all are in the same plane, so as to form a thin band which is not too bulky and does not require a thick tube wall to be fully covered. Also, the several loops or eyes are preferably out of contact with each other, so the rubber fills all spaces and fully covers and protects the wire. This prevents friction of the eyes or loops on each other, and avoids wearing through the plating metal on the wire and opening it up to rust, which is highly detrimental to certain textile fabrics. This wire fabric is commonly formed on a machine by bending the wire alternately around two or more loop forming pins, and in the normal operation of said machine the fabric emerges therefrom in a spiral coil usually about one and a half or two inches in diameter, depending upon the dimensions of the fabric, and consequently is produced in a form which can be readily incorporated into rubber hose or tubing of the common sizes without further manipulation.

The wire reinforcement or band shown in Figs. 1 to 4 is formed of a single wire, but it is to be understood that the invention is not limited to a single wire fabric or to the form shown, and may be variously modified without departing from the spirit of the invention. For example, Fig. 5 shows a modified form of wire band or reinforcement, formed of three wires 7 braided or interlocked with each other, each wire extending from edge to edge of the fabric. This fabric is not quite as elastic as the form first shown, but is sufficiently elastic so that it can be coiled spirally around or within the walls of the tube in the same manner as the form shown in Fig. 1.

The wire fabric is laid around the tube or embedded in the tube wall in the form of one or more spirals with a moderate pitch, one spiral being shown in each form illustrated. The successive turns may be connected at their adjacent edges but are shown as free from each other so that they act independently. Successive turns of the spiral or spirals are shown as spaced or separated from each other, but the amount of spacing depends upon the pitch and upon the degree of reinforcement desired, and may be more or less according to circumstances. When the wire fabric or band is applied to the tube it is held under slight tension while being wrapped or coiled thereon, and therefore hugs the tube tightly and does not become loose.

The reinforced hose is very resilient and can be bent or coiled in arcs of comparatively short radius without liability of the wire cutting through the rubber and textile fabric. At the same time the reinforcement prevents short or angular bends of the tube which are liable to break the tube walls. The fabric is not only flexible laterally or transversely, but also longitudinally, and may be stretched or compressed lengthwise. It consequently acts as a yielding armament both against bursting strains when the hose carries pressure, and against inward collapse when under suction. In both cases the wire fabric yields slightly, and either expands or contracts with and circumferentially of the tube, and thereby prevents the wires cutting through the tube wall. The fairly close network of wires protects the tube or hose at all points and not only strengthens it but also makes it much more durable.

What I claim is:

1. A rubber tube or conduit, comprising a rubber wall or body having a reinforement consisting of wire bent back and forth into zigzag form to form a series of oppositely disposed pear-shaped loops, said reinforcement being coiled into spiral form with the turns of the spirals spaced apart along the axis of the spiral and embedded within said tube wall.

2. A rubber tube or conduit, comprising a rubber wall or body having a reinforcement consisting of wire bent back and forth into zigzag form to form a series of oppositely disposed pear-shaped loops, said reinforcement being coiled into spiral form with the turns of the spirals spaced apart along the axis of the spiral and embedded within said tube wall, said spiral coil being also under initial tension when wound into the tube wall.

In testimony whereof, I have hereunto set my hand.

WILLIAM W. KINCAID.

Witnesses:
M. M. BEEMAN,
T. F. CHARLTON.